United States Patent [19]
Chiu et al.

[11] Patent Number: 6,020,774
[45] Date of Patent: Feb. 1, 2000

[54] GATED CLOCK TREE SYNTHESIS METHOD FOR THE LOGIC DESIGN

[75] Inventors: You-Ming Chiu, Hsinchuang; Jiin Lai, Taipei, both of Taiwan

[73] Assignee: VIA Technologies, Inc., Taipei, Taiwan

[21] Appl. No.: 09/121,296

[22] Filed: Jul. 23, 1998

[30] Foreign Application Priority Data

Mar. 2, 1998 [TW] Taiwan ................................ 87102972

[51] Int. Cl.[7] ..................................................... H03K 1/04
[52] U.S. Cl. .......................................... 327/295; 327/297
[58] Field of Search .................................... 327/295, 297, 327/564, 565, 105, 107; 326/93, 101

[56] References Cited

U.S. PATENT DOCUMENTS

| 3,745,472 | 7/1973 | Garth | 327/295 |
| 5,578,945 | 11/1996 | Flora | 326/93 |
| 5,923,188 | 7/1999 | Kametani et al. | 327/295 |

*Primary Examiner*—Toan Tran
*Attorney, Agent, or Firm*—Thomas, Kayden, Horstemeyer & Risley

[57] ABSTRACT

A gated clock tree synthesis (CTS) method is provided for the purpose of synthesizing a gate array logic circuit to allow optimal topological arrangement of the gate array on the logic circuit. This in turn allows the logic circuit to operate more efficiently. The logic circuit includes at least one clock generator, a plurality of control gates each having one input end connected to a control signal and the other input end connected to receive the output clock signal from the clock generator, a plurality of first logic elements that are directly driven by the output clock signal from the clock generator, and a plurality of second logic elements that are driven by the gated clock signal outputted from each of the control gates under control by the control signal. The gated CTS method comprises the steps of grouping the first logic elements into a plurality of groups, connecting each group of the first logic elements via a first buffer to one of the control gates, connecting each of the second logic elements via a second buffer to the clock generator, and connecting one input end of each of the control gates to the clock generator.

28 Claims, 3 Drawing Sheets

GATED CLOCK TREE SYNTHESIS METHOD FOR THE LOGIC DESIGN

CROSS-REFERENCE TO RELATED APPLICATION

This application claims the priority benefit of Taiwan application serial no. 87102972, filed Mar. 2, 1998, the full disclosure of which is incorporated herein by reference.

BACKGROUND OF THE INVENTION

1. Field of the Invention

This invention relates to clock tree synthesis (CTS) methods, and more particularly, to a gated CTS method which can help make the design of a gate array logic circuit less complex and less difficult for the designer, and which can make the resultant logic circuit more efficient in clocking performance.

2. Description of Related Art

In the manufacture of logic circuits, a common practice is the utilization of the so-called ASIC (application-specific integrated circuit) technology. ASIC technology involves fabrication of a special type of chip as a nonspecific collection of logic gates, and later in the manufacturing process, addition of a layer connecting the gates so as to provide the specified logic function. Where efficient power management is desired, the conventional gated CTS methods can be utilized to reduce power consumption. In these methods, the clock signal to a certain logic element will be enabled only when the logic element is in active operation; otherwise, the clock signal will be disabled. As a result, the power consumption of the logic element can be reduced. One drawback of the conventional CTS methods, however, is that they can be used only to synthesize on gated buffer, and is unable to synthesize gated clock buffer. Due to this drawback, the required logic gates in a buffer need to be additionally provided by the designer, which makes the design very complex and difficult for the designer. Besides, the transmission of the clock signals from one point to another can suffer from distortions due to lengthy transmission paths in cases where a gated clock signal is used to drive latches or registers, since a single buffer can be used for the transfer of various gated clock signals or non-gated clock signals.

FIG. 1 is a schematic diagram of a first example of a logic circuit, which is synthesized by utilizing a conventional gated CTS method. As shown, the logic circuit includes a clock generator 10, a plurality of buffers 11, 12, a plurality of AND gates 13, 14, 15, and a plurality of flip-flops 16, 17, 18, 19. The clock generator 10 is used to generate a clock signal which is buffered by the buffers 11, 12 and then gated by the AND gates 13, 14, 15 under control of the control signals A, B to be subsequently used to clock the flip-flops 16, 17, 18, 19. The outputs from the AND gates 13, 14, 15 respectively (for example the output CLK1 from the AND gate 13) are each referred to as a gated clock signal, whereas the clock signal CLK2 that is directly used to clock the flip-flops 16, 17 is referred as a non-gated clock signal.

FIG. 2 is a schematic diagram of a layout example, which is synthesized by conventional CTS method. As shown, this logic circuit includes a clock generator 20, a plurality of buffers 21, 22, a plurality of AND gates 23, 24, and a plurality of flip-flops 25, 26, 27. The buffers 21, 22 are used to transfer the output clock signal from the clock generator 20, and subsequently the outputs of the buffers 21, 22 are respectively used directly to drive the flip-flops 25, 26, 27. Meanwhile, the outputs of the buffers 21, 22 are respectively gated by the AND gates 23, 24 under control of the control signal C. The gated clock signal from the AND gate 23 is then used to drive the logic elements 31, 32 while the gated clock signal from the AND gate 24 is used to clock the next-stage logic element 33.

One drawback to the foregoing logic circuits, however, is that they may fail to provide optimal localization of the logic elements in the gate array such that the signal transmission can suffer from an increased time delay that degrades the performance of the circuit. In the case of FIG. 1, for example, those logic elements whose clock signals are enabled by the control signal A are arranged in separate areas. In the case of FIG. 2, for example, the gate control signal C needs to jump over the line between the output of the buffer 21 and one input of the AND gate 23 and then extend a long ways to the AND gate 24. The time delay in the control signal transferred over the lengthy line can thus be large, which degrades the performance of the logic circuit. There exists, therefore, a need for a new gated CTS method that represents a solution to this problem.

SUMMARY OF THE INVENTION

It is therefore an objective of the present invention to provide a gated CTS method, which allows the gate array on a logic circuit to be arranged with the optimal topology that allows the logic circuit to operate more efficiently.

In accordance with the foregoing and other objectives of the present invention, a new gated CTS method is provided. The gated CTS method of the invention used for the purpose of synthesizing a gate array logic circuit includes at least one clock generator, a plurality of control gates each having one input end connected to a control signal and the other input end connected to receive the output clock signal from the clock generator, a plurality of first logic elements that are directly driven by the output clock signal from the clock generator, and a plurality of second logic elements that are driven by the gated clock signal outputted from each of the control gates under the control of the control signal. The gated CTS method of the invention comprises the steps of grouping the first logic elements into a plurality of groups, connecting each group of the first logic elements via a first buffer to one of the control gates, connecting each of the second logic elements via a second buffer to the clock generator, and connecting one input end of each of the control gates to the clock generator.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

In the design of a logic circuit in accordance with the method of the invention, those logic elements in the logic circuit that are to be driven by the same gated clock signal are grouped into the same group and then arranged together as a collective unit in the same circuit layout area. For example, those logic elements that are to be driven by a first gated clock signal enabled by a first control signal are grouped into a first group. Those logic elements driven by a second gated clock signal enabled by a second control signal are grouped into a second group, and so forth. Further, those logic elements that are driven continuously without interruption by the system clock signal are grouped into another group. Each group of logic elements are arranged together as a collective unit in the same circuit layout area without being intermixedly arranged with those logic elements in other groups. This design scheme allows the gates to be arranged in an orderly fashion, making the design less complex and less difficult for the designer, when compared to the prior art. An example of a logic circuit, which is designed in accordance with the method of the invention, is depicted in the following with reference to FIG. 3.

Figure 1:
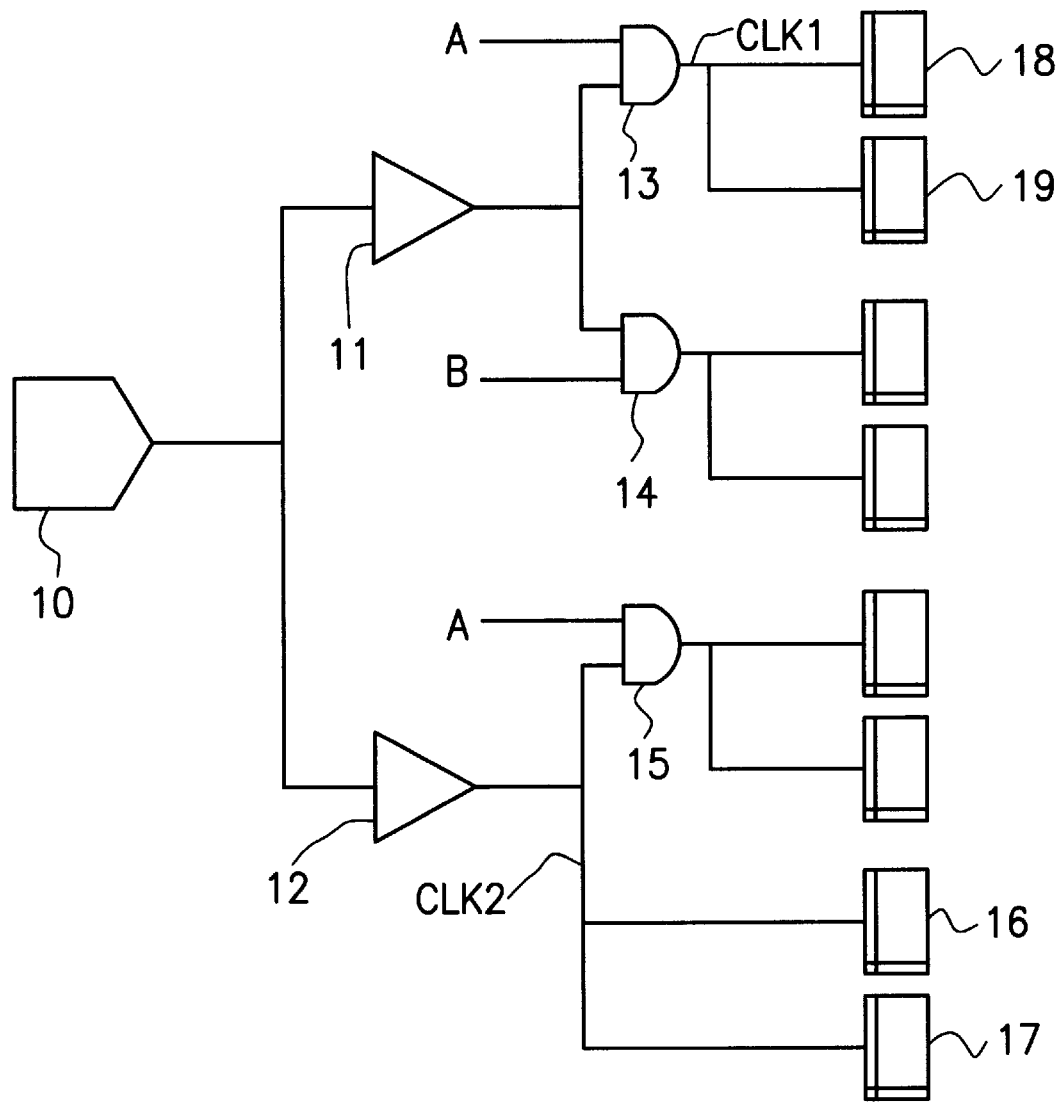
FIG. 1 is a schematic diagram of a first example of a logic circuit, which is synthesized by utilizing a conventional gated CTS method.
Figure 2:
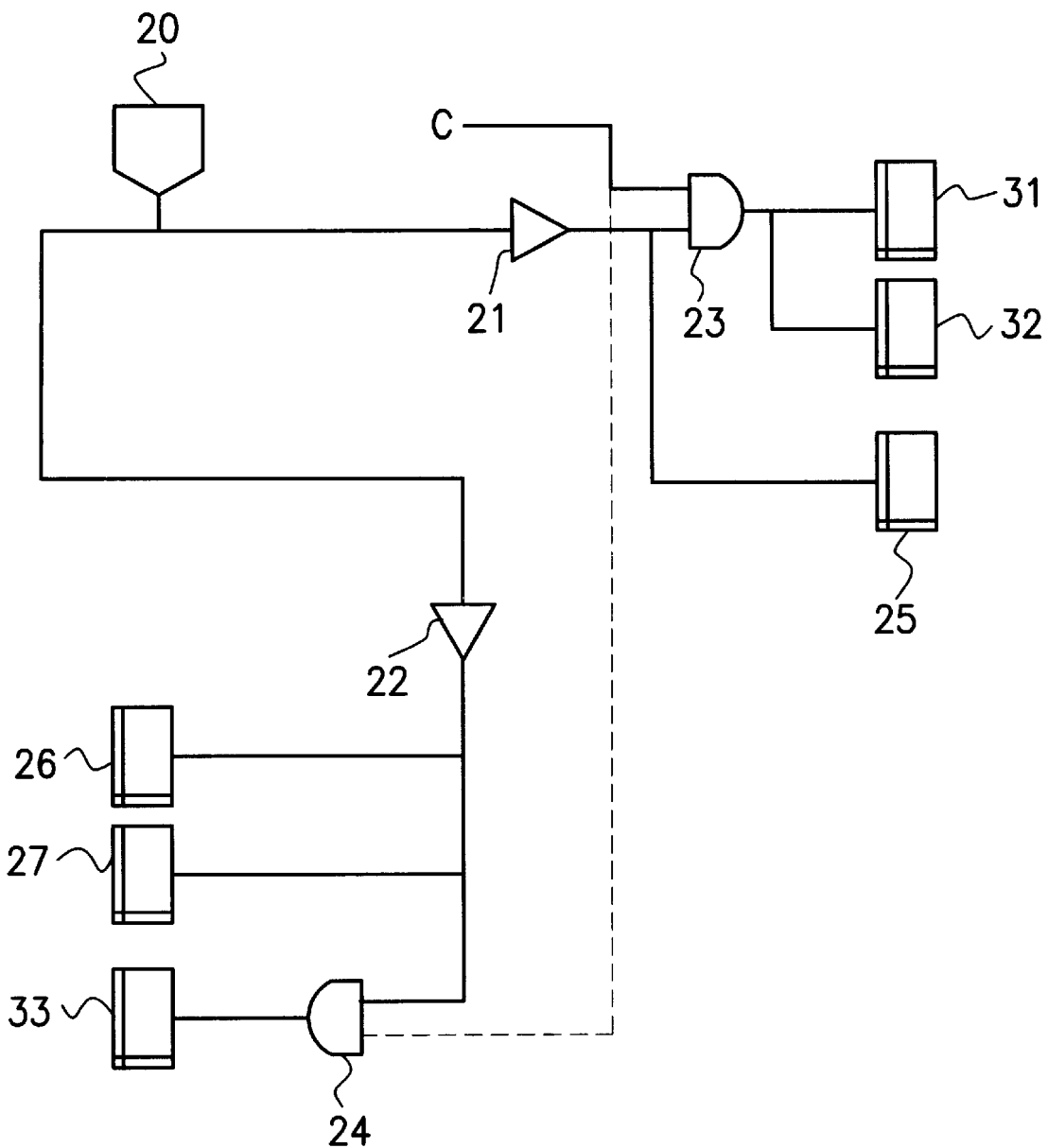
FIG. 2 is a layout diagram of a second example of a logic circuit which is synthesized by utilizing a conventional gated CTS method.
Figure 3:
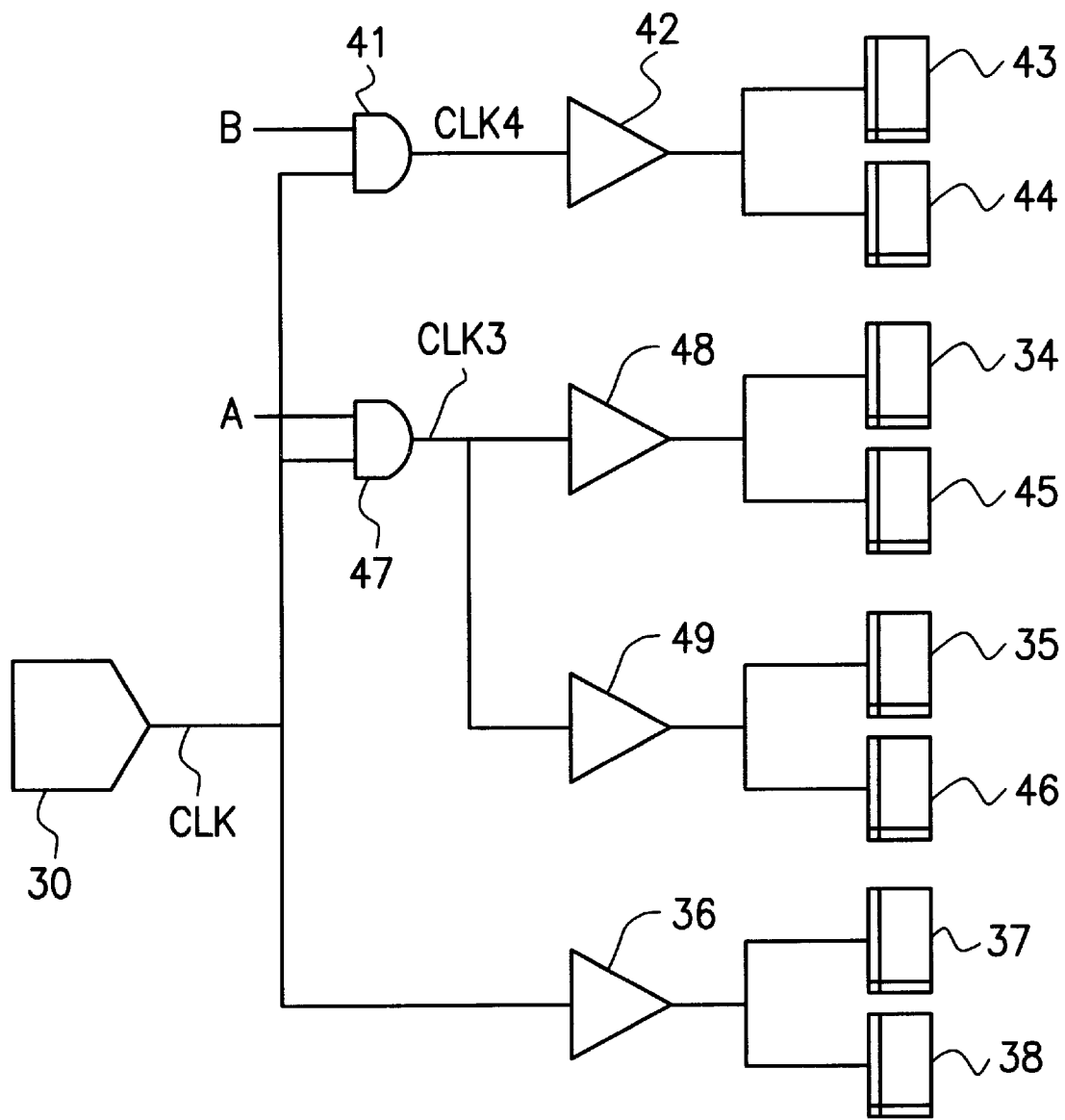
FIG. 3 is a schematic diagram of a logic circuit, which is synthesized by the gated CTS method of the invention.

FIG. 3 is a schematic diagram of a logic circuit, which is synthesized by the gated CTS method of the invention. As shown, the logic circuit includes a clock generator 30 for generating a clock signal CLK and a plurality of logic elements 43, 44, 34, 45, 35, 46, 37, 38 that are to be driven by the CLK signal, either directly or gated.

In the case of the logic circuit of FIG. 3, for example, the logic elements 43, 44, 34, 45, 35, 46, 37, 38 are grouped into three groups: a first group (43, 44) whose clock signal is enabled by a first control signal B; a second group (34, 35, 45, 46) whose clock signal is enabled by a second control signal A; and a third group (37, 38) which are continuously clocked without any interruption. In accordance with the invention, each of these groups of logic elements are arranged together as a collective unit in the same circuit layout area without being intermixedly arranged with those logic elements in other groups.

For the first group (43, 44), a first control gate 41, which can be either an AND gate or an OR gate, is arranged near this group. Additionally, a buffer 42 is coupled to the output of the control gate 41. When enabled by the control signal B, the control gate 41 transfers the gated clock signal CLK4 via the buffer 42 to the two logic elements 43, 44 in this group, so that the gated clock signal CLK4 can be used to drive the two logic elements 43, 44 in this group.

Similarly, for the second group (34, 35, 45, 46), a second control gate 47, which can be either an AND gate or an OR gate, is arranged near this group. Additionally, two buffers 48, 49 are coupled to the output of the control gate 47, with the output of the first buffer 48 being used to drive the two logic elements 34, 45, and the output of the second buffer 49 being used to drive the other two logic elements 35, 46. When enabled by the control signal A, the control gate 47 transfers the gated clock signal CLK3 respectively via the two buffers 48, 49 to all the logic elements 34, 35, 45, 46 in this group, so that the gated clock signal CLK3 can be used to drive the logic elements 34, 35, 45, 46 in this group.

For the third group (37, 38), a buffer 36 is coupled directly between the clock generator 30 and the two logic elements 37, 38 in this group, allowing the non-gated clock signal CLK from the clock generator 30 to be continuously transferred via the buffer 36 to the two logic elements 37, 38 in this group, so that the non-gated clock signal CLK can be used to drive the logic elements 34, 35, 45, 46 in this group.

It can be learned from the foregoing description that the logic circuit designed in accordance with the method of the invention will be more efficient in operation since the topology of the gates is such optimally arranged to allow shortened signal transmission paths. Furthermore, the method of the invention makes the design less complex and less difficult for the designer. The method of the invention is particularly useful for very complicated logic circuit structure that involves both gated clock signals and non-gated clock signals to drive the various logic elements in the circuit.

It is to be understood that the logic circuit of FIG. 3 is only an example of a logic circuit that is designed by using the method of the invention. Many other various logic circuits that involve the use of both gated clock signals and non-gated clock signals to drive the various logic elements can be designed by using the method of the invention. The method of the invention features an optimal topology that can help improve the performance of the logic circuit.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A gated CTS method for synthesizing a logic circuit including at least one clock generator, a plurality of control gates each having one input end connected to a control signal and the other input end connected to receive the output clock signal from the clock generator, a plurality of first logic elements driven directly by the output clock signal from the clock generator, and a plurality of second logic elements that are driven by the gated clock signal that is outputted from each of the control gates under control of the control signal, the gated CTS method comprising the steps of:

(1) grouping the first logic elements according to whether they are driven by a gated version of the clock signal from the clock generator or a non-gated version of the clock signal from the clock generator;

(2) connecting each group of the first logic elements via a first buffer to one of the control gates;

(3) connecting each of the second logic elements via a second buffer to the clock generator; and (4) connecting one input end of each of the control gates to the clock generator.

2. The method of claim 1, wherein each the first logic element is a flip-flop.

3. The method of claim 1, wherein each the first logic element is a latch.

4. The method of claim 1, wherein each second logic element is a flip-flop.

5. The method of claim 1, wherein each the second logic element is a latch.

6. The method of claim 1, wherein each the control gate is an AND gate.

7. The method of claim 1, wherein each the control gate is an OR gate.

8. A gated CTS method for synthesizing a logic circuit which requires a number of gated clock signals and non-gated clock signals to operate, the gated clock signals each being enabled by a corresponding control signal, the method comprising the steps of:

(1) connecting each control signal to a corresponding control gate;

(2) grouping a plurality of first logic elements according to whether driven by a gated version of the clock signal from the clock generator or a non-gated version of the clock signal from the clock generator;

(3) connecting each group of the first logic elements via a first buffer to one of the control gates;

(4) connecting each of a plurality of second logic elements via a second buffer to the clock generator; and (5) connecting one input end of each the control gate to the clock generator.

9. The method of claim 8, wherein each the first logic element is a flip-flop.

10. The method of claim 8, wherein each the second logic element is a latch.

11. The method of claim 8, wherein each the second logic element is a flip-flop.

12. The method of claim 8, wherein each the second logic element is a latch.

13. The method of claim 8, wherein each the control gate is an AND gate.

14. The method of claim 8, wherein each the control gate is an OR gate.

15. A gated clock tree synthesized logic circuit, which comprises:

at least one clock generator for generating a clock signal;

a plurality of control gates each having one input end connected to a control signal and the other input end connected to receive the output clock signal from the clock generator;

a plurality of first buffers, each having an input end connected to receive the gated clock signal from each of the control gates;

at least one second buffer having an input end connected to receive the clock signal from the clock generator;

a plurality of first logic elements, coupled respectively to the first buffers so as to be driven by the gated clock signal buffered by the first buffers; and a plurality of second logic elements, coupled to the second buffer so as to be driven by the clock signal buffered by the second buffer.

16. The logic circuit of claim 15, wherein each the first logic element is a flip-flop.

17. The logic circuit of claim 15, wherein each the first logic element is a latch.

18. The logic circuit of claim 15, wherein each the second logic element is a flip-flop.

19. The logic circuit of claim 15, wherein each the second logic element is a latch.

20. The logic circuit of claim 15, wherein each the control gate is an AND gate.

21. The logic circuit of claim 15, wherein each the control gate is an OR gate.

22. A gated CTS method for synthesizing a logic circuit which is driven by a system clock signal and requires a number of gated versions of the system clock signal and non-gated versions of the system clock signal to operate, each of the gated clock signals being enabled by a corresponding control signal, the method comprising the steps of:

(1) connecting each control signal to a corresponding control gate;

(2) grouping a plurality of first logic elements according to whether driven by a gated version of the clock signal from the clock generator or a non-gated version of the clock signal from the clock generator;

(3) connecting each group of the first logic elements via a first buffer to one of the control gates;

(4) connecting each of a plurality of second logic elements via a second buffer to the system clock signal; and (5) connecting one input end of each of the control gates to the system clock signal.

23. The method of claim 22, wherein each the first logic element is a flip-flop.

24. The method of claim 22, wherein each the first logic element is a latch.

25. The method of claim 22, wherein each the second logic element is a flip-flop.

26. The method of claim 22, wherein each the second logic element is a latch.

27. The method of claim 22, wherein each the control gate is an AND gate.

28. The method of claim 22, wherein each the control gate is an OR gate.

* * * * *